US008640322B1

(12) United States Patent
Nikkel

(10) Patent No.: US 8,640,322 B1
(45) Date of Patent: Feb. 4, 2014

(54) ADAPTER FOR INCREASING THE STROKE LENGTH OF A FASTENER INSTALLATION TOOL

(76) Inventor: Robert E. Nikkel, Fort Collins, CO (US)

( * ) Notice: Subject to any disclaimer, the term of this patent is extended or adjusted under 35 U.S.C. 154(b) by 302 days.

(21) Appl. No.: 13/229,899

(22) Filed: Sep. 12, 2011

(51) Int. Cl.
*B21D 39/00* (2006.01)
*B21J 15/02* (2006.01)
*B23P 11/00* (2006.01)

(52) U.S. Cl.
USPC ................ 29/524.1; 29/243.521; 29/243.522; 29/525.06; 29/525.05; 29/812.5; 72/453.19; 72/466.4

(58) Field of Classification Search
USPC ............... 29/524.1, 525.05, 525.06, 243.521, 29/243.522, 243.523, 243.524, 34 B, 29/812.5; 72/391.2, 391.4, 391.6, 391.8, 72/453.19, 466.4, 466.5
See application file for complete search history.

(56) References Cited

U.S. PATENT DOCUMENTS

| | | | | |
|---|---|---|---|---|
| 637,489 | A | 11/1899 | Thompson | |
| 2,370,840 | A | 3/1945 | Carlson | |
| 3,365,965 | A | 1/1968 | French | |
| 3,491,578 | A | 1/1970 | Biermann | |
| 3,961,517 | A | 6/1976 | DiMaio | |
| 4,258,580 | A | 3/1981 | Lowe | |
| 4,628,722 | A | 12/1986 | Mauer | |
| 4,836,062 | A * | 6/1989 | LaTorre | 81/55 |
| 5,036,572 | A * | 8/1991 | Rosier | 29/243.522 |
| 5,295,290 | A * | 3/1994 | Johnston | 29/243.527 |
| 5,357,666 | A * | 10/1994 | El Dessouky et al. | 29/243.521 |
| 6,021,553 | A | 2/2000 | Bieber | |
| 6,321,433 | B1 * | 11/2001 | Cliff et al. | 29/240.5 |
| 6,622,802 | B2 * | 9/2003 | Hezeltine | 173/1 |
| 6,684,470 | B1 | 2/2004 | Joux | |
| 7,048,073 | B2 * | 5/2006 | Hezeltine | 173/1 |
| 7,243,525 | B2 | 7/2007 | Galluzo | |
| 7,407,070 | B2 * | 8/2008 | Hezeltine | 227/10 |
| 7,530,155 | B1 * | 5/2009 | Nikkel | 29/524.1 |
| 7,565,726 | B1 | 7/2009 | Ko | |
| 7,647,680 | B2 * | 1/2010 | Dear | 29/243.523 |
| 8,371,017 | B1 * | 2/2013 | Nikkel | 29/525.01 |
| 8,495,807 | B2 * | 7/2013 | Szewc et al. | 29/240.5 |
| 2002/0139546 | A1 * | 10/2002 | Hezeltine | 173/1 |
| 2002/0144574 | A1 * | 10/2002 | Avetisian et al. | 81/55 |
| 2004/0035902 | A1 * | 2/2004 | Hezeltine | 227/10 |
| 2004/0045728 | A1 * | 3/2004 | Hezeltine | 173/1 |
| 2008/0222868 | A1 * | 9/2008 | Dear | 29/243.521 |
| 2010/0325857 | A1 * | 12/2010 | Szewc et al. | 29/240.5 |
| 2013/0180364 | A1 * | 7/2013 | Galat | 81/56 |

* cited by examiner

*Primary Examiner* — Essama Omgba
(74) *Attorney, Agent, or Firm* — Marian J. Furst

(57) ABSTRACT

Adapter for increasing the stroke length of a fastener installation tool. The adapter includes a tensile member with a first rack gear, a compressive member with a second rack gear, and a plurality of pinion gears retained within a pinion gear housing. The tensile member is mateable with the puller shaft of the installation tool and with the tensile member of an installation head. The pinion gear housing is mateable with the body of the installation tool. The distal end of the compressive member is mateable with a reducing member, which in turn mates with the outer sleeve of the installation head. Operation of the pulling tool moves the tensile member axially toward the tool body and engages the pinion gears, which in turn move the compressive member axially away from the tool body.

16 Claims, 5 Drawing Sheets

ADAPTER FOR INCREASING THE STROKE LENGTH OF A FASTENER INSTALLATION TOOL

FIELD OF THE INVENTION

The present invention relates generally to an adapter assembly for use with a fastener installation tool for installing blind fasteners, and more particularly to an adapter assembly that increases the stroke length provided by an installation tool and to a method for use thereof.

BACKGROUND OF THE INVENTION

Blind fasteners used in the aerospace and other industries have both a diameter and sleeve length in their respective designs. Some fastener designs are created to produce a large amount of clamp-up, wherein the fastener, when it is installed, pulls the two work pieces together making them as tight as the upset load required to install the fastener. Other fastener designs are created to produce a hole filling requirement, wherein the fastener, when it is installed, expands outward against the work piece hole in which it is positioned, thus having both clamp-up and hole fill characteristics.

This second type of fastener is normally referred to as a "wire draw" fastener and comprises an inner, plugging portion attached to the upper stem portion of the fastener and a sleeve portion that is designed to expand when the installation tool pulls the stem portion. During installation, the plugging portion is drawn into the sleeve portion, and the plugging portion is elongated (stretched) within the sleeve portion until the stem is captured within the sleeve portion and breaks away from the plugging portion.

Normal fastener installation tools have a stroke length between about 0.45 inches and about 0.75 inches, which can install most blind rivets and many wire draw blind fasteners. However, wire draw blind fasteners are in use now that have longer grips, such as a –06 or a –07 grip length (for extending through a workpiece that is 6/16=3/8 inch or 7/16 inch thick, respectively), and the normal installation tool's stroke length is insufficient to install the fastener with a single stroke.

It is undesirable to use multiple tool strokes to install fasteners, because the first stroke work hardens the fastener. Re-gripping the fastener stem with the installation tool and pulling a second time often causes the stem to break off with too short a length, resulting in an unacceptable installation. Special, long stroke tools must be employed for these wire draw fasteners in the longer grip ranges. However, these special tools are much larger and heavier than standard installation tools, in addition to being much more expensive.

Commercial production shops, such as aircraft industry production shops, are replacing air-driven installation tools, attached to air hoses, with cordless, battery-operated installation tools to eliminate the tripping hazard posed by the air hoses dragged along the floor. However, cordless tools do not normally operate as quickly as air-driven tools, requiring two to three times as long to install a fastener.

Thus, there is a need for an adapter for use with a standard installation tool that increases the stroke length to allow single-stroke installation of blind fasteners having long grips. There is also a need for an adapter that increases the speed and efficiency of fastener installation in both cordless and standard air-driven tools.

SUMMARY OF THE INVENTION

To achieve the foregoing and other objects and in accordance with the purpose of the present invention broadly described herein, one embodiment of this invention comprises an adapter for use in installing blind fasteners using an installation tool and an installation head. The installation tool has a puller shaft for applying tensile force and a tool body portion for applying compressive force, and the installation head has a gripping mechanism for applying tensile force to a fastener and a sleeve surrounding the gripping mechanism for applying compressive force. The adapter comprises a tension member having a proximal end mateable with the puller shaft of the installation tool and a distal end mateable with the gripping mechanism of the installation head. The tension member also has a first rack gear formed in its outer surface. The adapter further comprises a compression member having an opening therethrough with an inner surface and is disposed around the tension member. The opening is sized to accommodate relative axial sliding of the tension member relative to the compression member. The compression member has a second rack gear formed in the inner surface. The adapter also comprises a reducing member having a substantially cylindrical opening therethrough, a proximal end mateable with the distal end of the compression member, and a distal end mateable with the installation head sleeve. A pinion gear housing is mateable with the tool body and includes a plurality of pinion gears retained within the housing and engaged with the first and second rack gears. The adapter is operative to increase a stroke length provided by the installation tool.

The adapter may be operative to double the stroke length provided by the installation tool or to decrease the time required for installing a fastener. There may be four pinion gears retained within the housing.

Another embodiment of the present invention comprises an assembly for installing blind fasteners. The assembly comprises a fastener installation tool having a puller shaft for applying tensile force and a tool body for applying compressive force during operation, a fastener installation head having a gripping mechanism for applying tensile force to a fastener and a sleeve surrounding the gripping mechanism for applying compressive force, and an adapter for joining the tool and the installation head. The adapter comprises a tension member, a compression member, a reducing member, a pinion gear housing, and a plurality of pinion gears retained within the housing. The tension member has a proximal end mateable with the puller shaft of the installation tool, a distal end mateable with the gripping mechanism of the installation head, and a first rack gear formed in its outer surface. The compression member has an opening therethrough and is disposed around the tension member. The compression member has an inner surface with a second rack gear formed in the inner surface. The opening is sized to accommodate relative axial sliding of the tension member relative to the compression member. The reducing member has a substantially cylindrical opening therethrough, a proximal end mateable with the distal end of the compression member and a distal end mateable with the installation head sleeve. The pinion gear housing is mated with the tool body, and the pinion gears are engaged with the first and second rack gears. The adapter is operative to increase a stroke length provided by the installation tool and/or decrease the time required for installing a fastener.

The adapter may be operative to double the stroke length provided by the installation tool. Four pinion gears may be retained within the housing.

Yet another embodiment of the invention comprises a method for increasing a tool stroke length for installing a blind fastener into a workpiece. The method comprises the steps of providing an installation tool assembly, providing a workpiece having a hole extending therethrough sized to accommodate the blind fastener, inserting the blind fastener through the hole and gripping a stem of the fastener with the gripping mechanism, and using the tool puller shaft to simultaneously apply tensile force to the tensile member of the adapter and compressive force to the pinion gear housing, thereby causing the first rack gear to drive the pinion gears, which in turn drive the second rack gear. The assembly comprises a fastener installation tool having a puller shaft for applying tensile force and a tool body for applying compressive force during operation, a fastener installation head having a gripping mechanism for applying tensile force to a fastener and a sleeve surrounding the gripping mechanism for applying compressive force, and an adapter joining the tool and the installation head. The adapter comprises a tension member, a compression member, a reducing member, and a pinion gear housing that retains a plurality of pinion gears. The tension member has a proximal end mateable with the puller shaft of the installation tool, a distal end mateable with the gripping mechanism of the installation head, and a first rack gear formed in its outer surface. The compression member has an opening therethrough with an inner surface and disposed around the tension member. The opening is sized to accommodate relative axial sliding of the tension member relative to the compression member. The compression member has a second rack gear formed in the inner surface. The reducing member has a substantially cylindrical opening therethrough, a proximal end mated with the distal end of the compression member and a distal end mated with the installation head sleeve. The pinion gear housing is mated with the tool body. The pinion gears are engaged with the first and second rack gears. The tool has a stroke length for relative axial motion between the puller shaft and the tool body, and the adapter is operative to increase the stroke length provided by the installation tool.

The using step may comprise installing the fastener using a single tool stroke. The first and second rack gears may have a 1:1 gear ratio, with the using step comprising providing a stroke length to the fastener head that is twice the tool stroke length. The using step may comprise providing a stroke length to the fastener head that is longer than about ⅜ inch and/or decreasing the time required for installing a fastener.

BRIEF DESCRIPTION OF THE DRAWINGS

These and other features, aspects, and advantages of the present invention will become better understood with reference to the following description, appended claims, and accompanying drawings, where:

DESCRIPTION OF THE PREFERRED EMBODIMENTS

In accordance with the present invention, an adapter may be used to connect a standard installation head to a standard fastener installation tool and provide an increased stroke length for proper installation of blind fasteners that require stroke lengths longer than the normal stroke length of the tool. The adapter provides the installation head with an increased stroke length compared to the installation tool stroke length. In a preferred embodiment, the adapter doubles the tool stroke length. Thus, with the maximum tool stroke length, generally no more than about ¾ inch, the adapter provides an installation head stroke length of up to 1.5 inches. Thus, the adapter can be used to install fasteners requiring stroke lengths of more than ¾ inch in a single stroke, wherein the fastener's internal drawn portion must be pulled to a length beyond the normal stroke of the fastener installation tool. The adapter can also be used with any standard installation tool and any standard installation head and can be used with conventional fasteners requiring stroke lengths shorter than ¾ inch.

As used herein, the term "proximal" refers to a part of a component that is nearest a fastener installation tool. The term "distal" refers to a part of a component that is farthest from the tool. Axial refers to a direction or motion along a central axis passing through the compressive and tensile components of the adapter.

Figure 1:
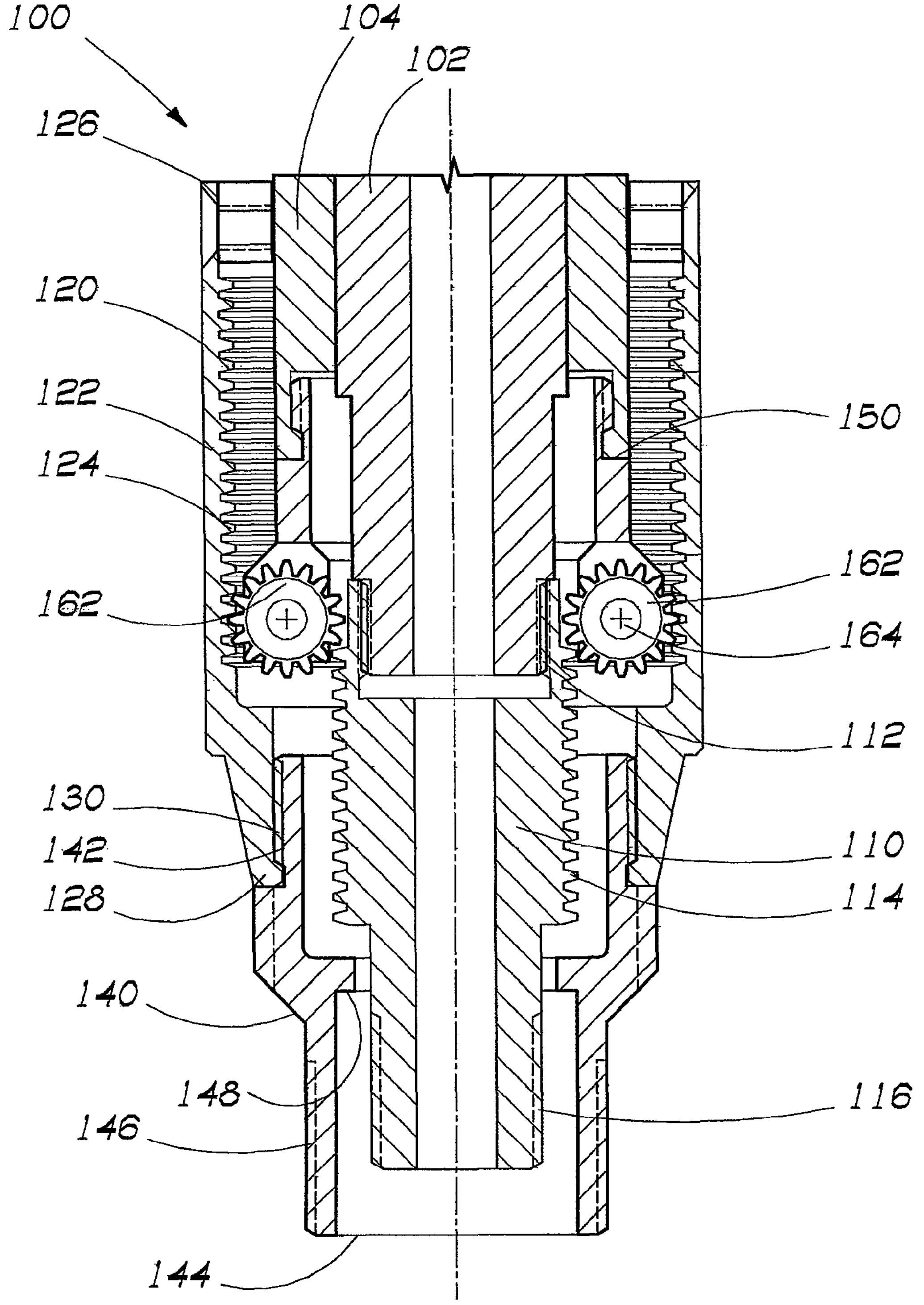
FIG. 1 is a cross sectional view of an adapter of the present invention mounted onto a fastener installation tool.
Figure 2:
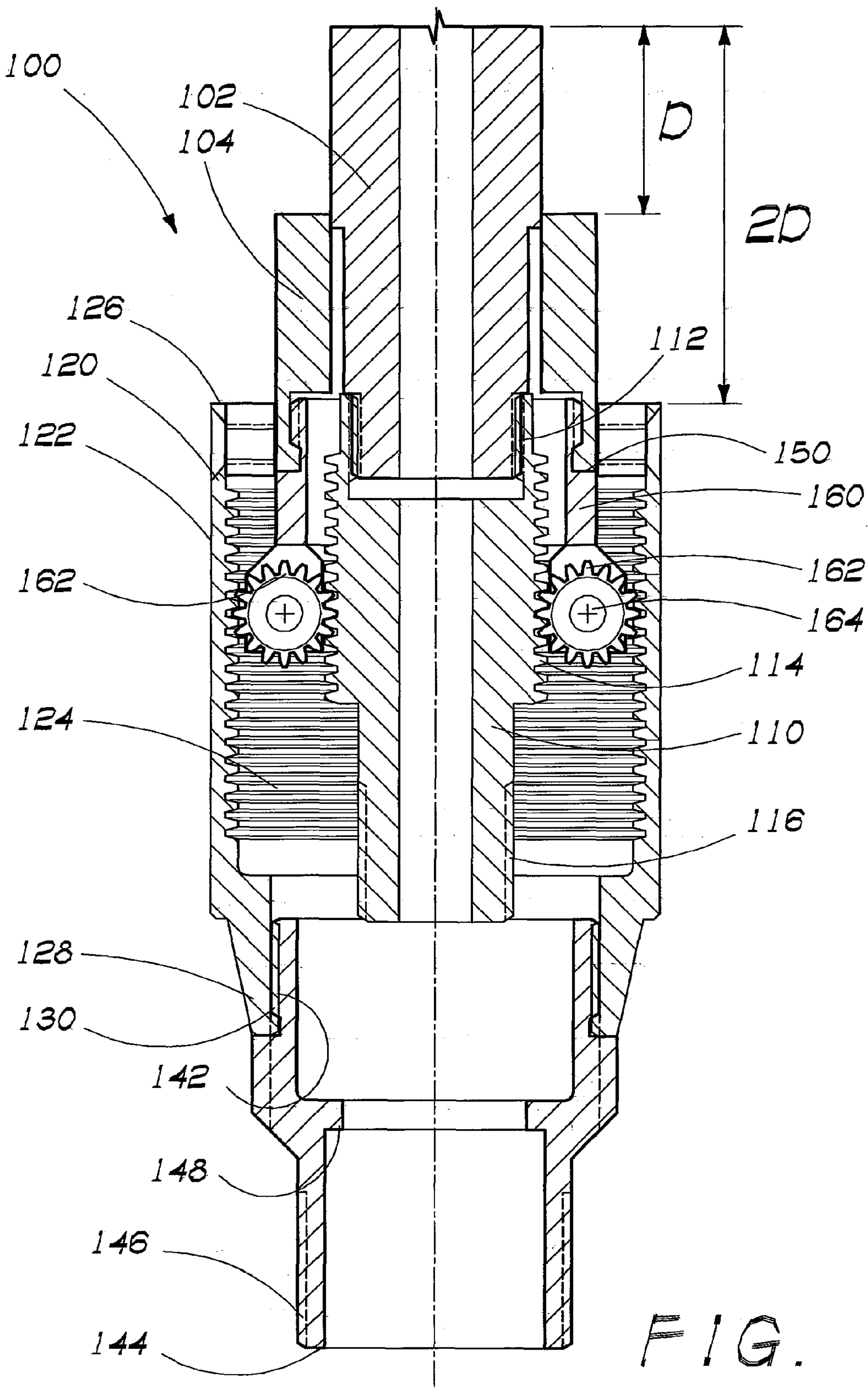
FIG. 2 is a cross sectional view of the adapter of FIG. 1 with the tensile components retracted axially relative to the compressive components, which have traveled an equal distance in the opposite direction.

As shown in FIGS. 1 and 2, adapter 100 comprises a tension member 110, a compression member 120, a reducing member 140, a pinion gear housing 160, and a plurality of pinion gears 162.

Figure 3:
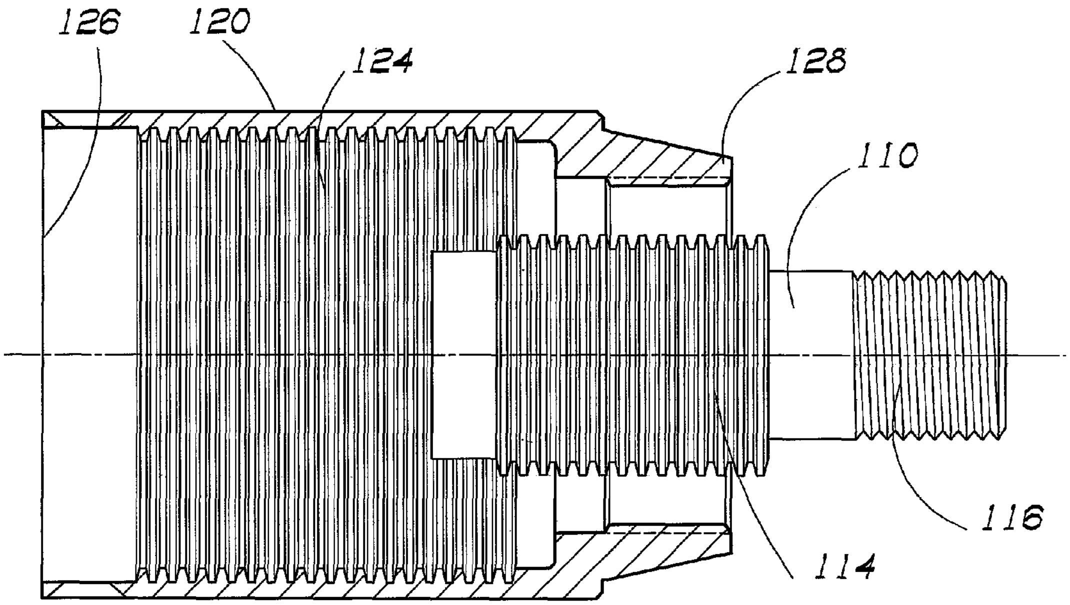
FIG. 3 is a cross sectional view of a compression member and a side view of a tensile member of the adapter of FIG. 1 showing rack gears of each member.
Figure 4:
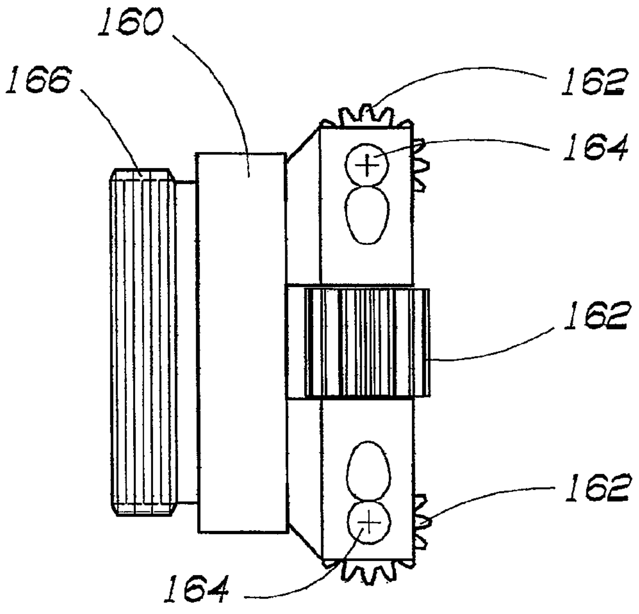
FIG. 4 is a side view of a pinion gear assembly of the adapter of FIG. 1.
Figure 5:
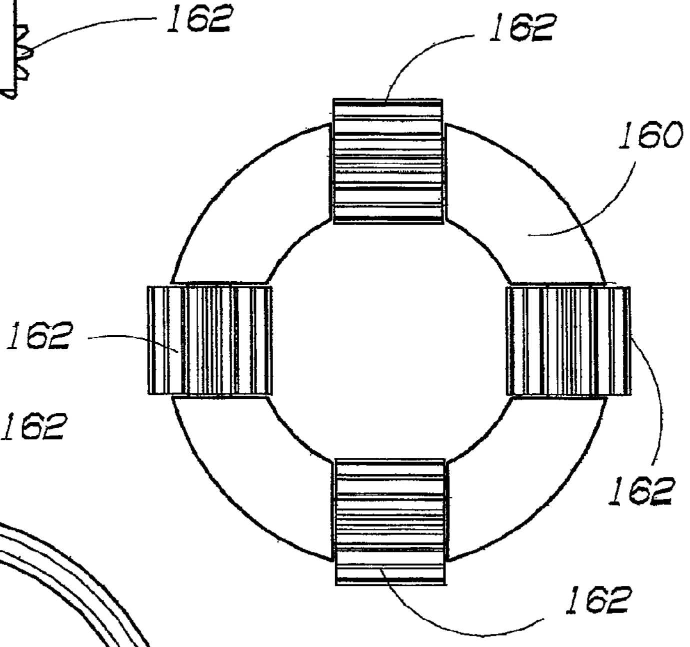
FIG. 5 is a distal end view of the pinion gear assembly of FIG. 4.
Figure 6:
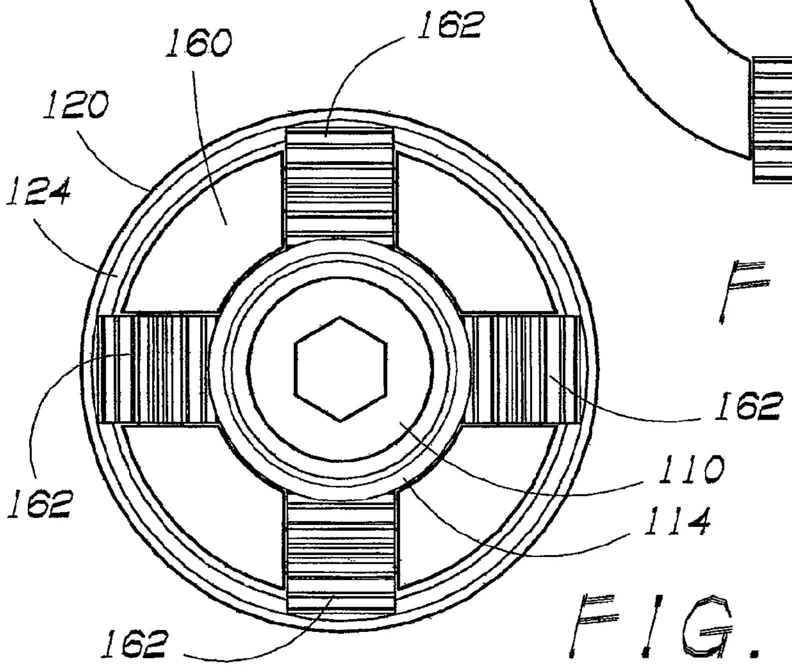
FIG. 6 is a distal end view of the pinion gear assembly of FIG. 4 with both the outer sleeve rack and puller shaft rack.

Tension member 110 can be mounted onto an installation tool puller shaft 102, such as via screw threads 112 at the proximal end of the tension member 110. Tension member 110 has a series of uniformly spaced rack gear teeth 114 cut into a cylindrical outer surface. As shown in FIGS. 1-3, the rack gear teeth 114 are circumferential on the external surface of the tension member 110, extending all the way around the external surface. Alternatively, the rack teeth could be formed into portions of the circumference. The distal end of tension member 110 is adapted for attachment, such as with screw threads 116, to a jaw holder assembly 180 of an installation head, shown in FIGS. 7 and 8.

Compression member 120 comprises a cylindrical sleeve 122 with rack gear teeth 124 cut into its interior surface. Unlike conventional adapters for installation tools, the proximal end 126 of compression member 120 is not directly attached to the compression portion 104 of the installation tool and can move relative to the tool. The proximal end 126 of compression portion member 120 has an inner diameter sized to allow compression member 120 to slide axially relative to the tool. Distal end 128 of compression member 120 is adapted for engagement with reducing member 140, such as with screw threads 130.

Reducing member 140 is joined to compression member 120, such as with proximal screw threads 142 that engage distal screw threads 130 of compression member 120. The outer diameter of reducing member 140 decreases distally, with its distal end 144 joinable to the compression portion of an installation head, such as with external screw threads 146 that are mateable with internal screw threads at the proximal portion of the installation head. The internal surface is preferably cylindrical with an inner diameter selected to position a cylindrical sleeve or compressive portion of a pulling head. Flange 148 extends radially inward, providing additional strength to carry the compression load applied by the installation head sleeve during operation.

Referring to FIGS. 1, 2, and 4-6, a plurality of pinion gears 162 are arranged radially and mounted on high-strength shafts or dowel pins 164 within housing 160. Pinion gear housing 160 can be joined to the compression member 104 of the installation tool, such as via proximal screw threads 166. The space between the inner surface of each pinion gear 162 and the outer surface of pin 164 onto which the gear is mounted should allow free rotation of the pinion gear 162 around the pin 164. A spacing of 0.001 inch has been found satisfactory. For simplicity of construction, it has been found that no additional bearings are required; the pinion gears do not rotate significantly more than one time around the dowel pins 164. Pinion gears 162 have teeth sized to engage simultaneously external rack gear 114 of tension member 110 and internal rack gear 124 of compression member 120, allowing rack gear 114 to drive pinion gears 162, which in turn drive rack gear 124, compression member 120, and reducing member 140.

With a normal adapter or with the installation head coupled directly to the installation tool, tensile force is applied via the puller shaft and jaw portion of the installation head, with these parts moving relative to the stationary tool and compressive portion of the installation head. Thus, comparing FIGS. 1 and 2, the axial distance D traveled by the puller shaft, jaws, and fastener engaged by the jaws is no more than the maximum travel of the puller shaft relative to the installation tool.

Unlike a conventional adapter, the compression member 120 and reducing member 140 do not couple the compression portion of the installation head to the tool body. Thus, the compression member of the adapter and the compression portion of the installation head are not held stationary relative to the tool body, and both the tensile and compression components move relative to the tool body during tool use, such as for fastener installation. Pinion gears 162 cause the compression member 120 to move axially and distally relative to the tool, with the axial motion of the compression member 120 equal and opposite to the axial motion of the tension member 110. Thus, comparing FIGS. 1 and 2, the relative travel distance of the compression and tensile members is 2D, double what one would obtain with a conventional tool and either a conventional adapter or no adapter. The motion of the compression member 120 is transferred to the compression portion of the installation head.

As shown in FIGS. 1-3, rack gear teeth 114 and 124 and the teeth on pinion gears 162 are sized with a gearing of 1:1, doubling the stroke length of the installation tool. Different gearing may be used to change the factor by which the tool stroke length is changed. The adapter of the present invention may have screw threads or other fastening systems adapted for use with any available installation tool and any available installation head.

All parts of the adapter can be formed by machining blocks of a suitable material, such as alloy steel, and then heating the machined blocks for added strength. Alternatively, parts may be cast, followed by grinding the gear teeth into the respective surfaces. For production parts, the rack teeth may be formed into the tension and compression members by turning them on a lathe, such as a CNC machine, and cutting the teeth into the material with a cutting tool. After each tooth is cut, the lathe cutting tool is repositioned to cut the next tooth, moving a distance selected to provide the desired gear tooth pitch, size, and shape.

The adapter 100 may be assembled as it is installed onto an installation tool. Pinion gears 162 are secured to pinion gear housing 160 with pins 164. Compression member 120 is then placed around the pinion gears 162 and pinion gear housing 160. The rack gear teeth of the sleeve index the pinion gear teeth automatically during assembly. The proximal end of pinion gear housing 160 is screwed or otherwise joined to the compressive portion 104 of the installation tool. Tension member 110 is placed inside compression member 120 by sliding from the distal end of compression member 120, and tension member 110 is then screwed onto or otherwise joined to the tool puller shaft 102. The tension member rack teeth (114) are designed to interface with the pinion gear teeth when the tension member is threaded onto the tool puller shaft (102). Reducing member 140 is then screwed or otherwise mounted onto the distal end 128 of compression member 120. The desired installation head is then mounted onto the distal ends of tension member 110 and reducing member 140.

Figure 7:
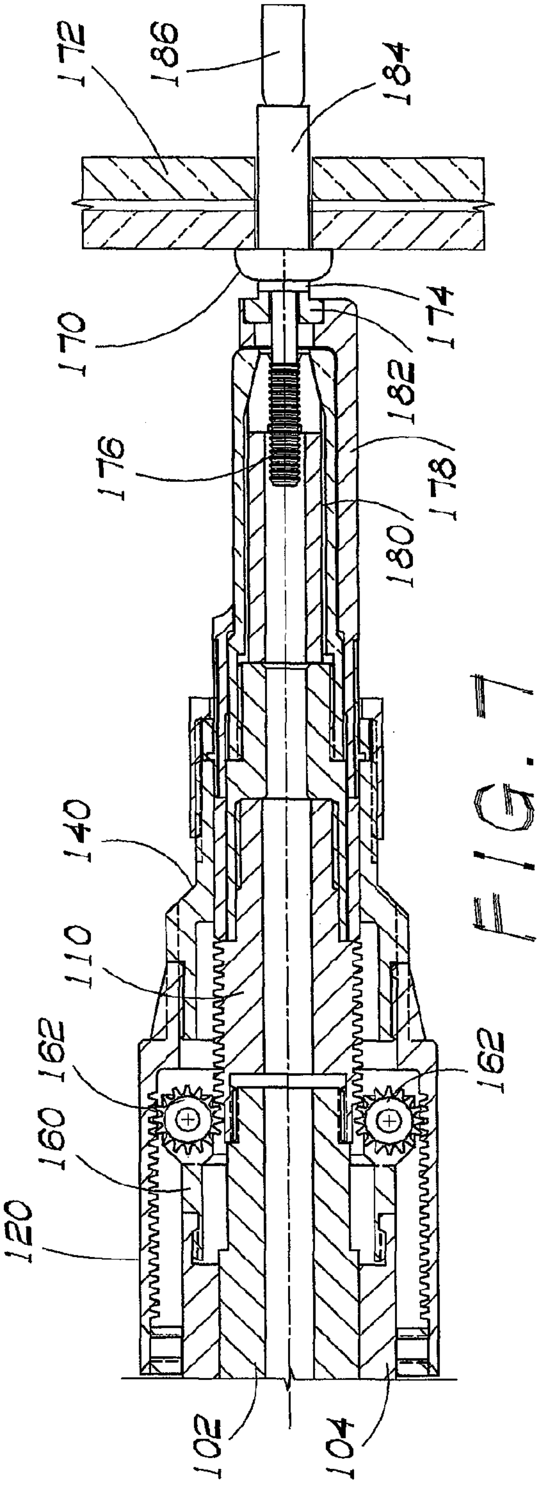
FIG. 7 is a cross sectional view of an adapter assembly, a fastener, and a work piece prior to installation of a wire draw fastener.
Figure 8:
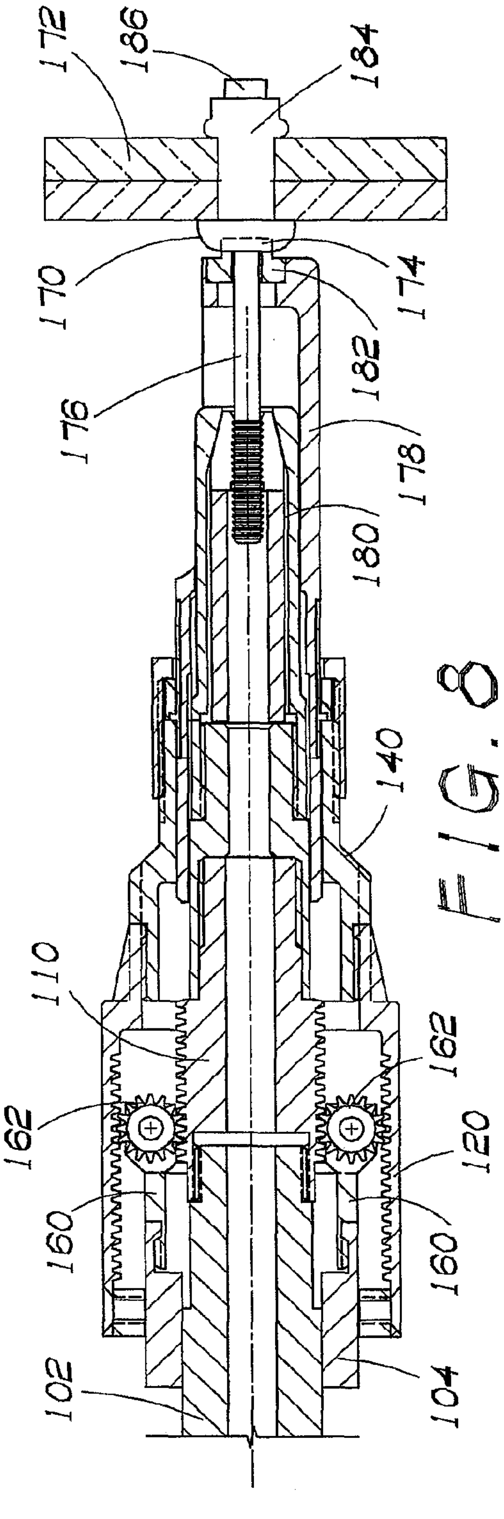
FIG. 8 is a cross sectional view of the adapter assembly of FIG. 7 after installation of the fastener.

As shown in FIGS. 7 and 8, a tool assembly comprising a conventional fastener installation tool, the adapter of the present invention, and a conventional installation head, can be used in a similar manner as a conventional tool assembly to install fasteners. A fastener, such as wire-drawn rivet 170, is inserted through an opening passing through a work piece 172, and a lock ring 174 is secured onto the rivet stem 176. The stem 176 is then inserted through the anvil or nose piece 182 of the installation head compression sleeve 178 and into the distal end of the installation head jaw holder assembly 180, with the anvil or nose piece 182 of the installation head positioned against the lock ring 174. As the installation tool is operated, the jaw holder assembly 180 grips the rivet stem 176 and applies tensile force. Simultaneously, pinion gears 162, engaged with rack teeth 114 and 124, move compression member 120, reducing member 140, and installation head sleeve 178 axially to apply compressive force to rivet sleeve 184. Rivet plug 186, attached to rivet stem 176, is compressed against the distal side of workpiece 172 as rivet stem is pulled axially toward the installation tool. Other types of blind fasteners could be installed with the same installation tool and adapter, with an appropriately selected installation head.

Adapter 100 can be used to increase the stroke length for installing fasteners requiring a longer stroke than is provided by conventional installation tools. An additional advantage of the adapter is that it allows standard or conventional fasteners to be installed more quickly with any stroke length. With a tensile member compressive member gearing of 1:1 via pinion gears, and thus a doubled stroke length, a fastener can be installed in one half of the time required with a conventional adapter or with an installation head joined directly to an installation tool.

The use of cordless installation tools hitherto provided the advantage of eliminating air hoses and their associated tripping hazard from the installation work area. The present invention adds the ability to use cordless installation tools and achieve the same productivity obtainable with air-driven tools. Indeed, the inventor has used a cordless tool equipped with the adapter to install a variety of blind fasteners in approximately the same time as installation with a conventional air-driven installation tool. Thus, the adapter provides increased efficiency and safety for users, allowing more rapid fastener installation with cordless tools and elimination of the hazards posed by hoses connected to air-driven tools.

The foregoing description is considered as illustrative only of the principles of the invention. Further, since numerous modifications and changes will readily occur to those skilled in the art, it is not desired to limit the invention to the exact construction and process shown and described above.

Accordingly, all suitable modifications and equivalents may be resorted to falling within the scope of the invention.

I claim:

1. An adapter for use in installing blind fasteners using an installation tool and an installation head, said installation tool having a puller shaft for applying tensile force and a tool body portion for applying compressive force, said installation head having a gripping mechanism for applying tensile force to a fastener and a sleeve surrounding the gripping mechanism for applying compressive force, said adapter comprising:

a tension member having a proximal end mateable with the puller shaft of the installation tool and a distal end mateable with the gripping mechanism of the installation head, said tension member also having a first rack gear formed in its outer surface;

a compression member having an opening therethrough with an inner surface and disposed around said tension member, the opening sized to accommodate relative axial sliding of said tension member relative to said compression member, said compression member having a second rack gear formed in said inner surface;

means for mounting said compression member to the installation head sleeve;

a pinion gear housing mateable with the tool body; and a plurality of pinion gears retained within said housing and engaged with said first and second rack gears;

wherein said adapter is operative to increase a stroke length provided by the installation tool.

2. The adapter of claim 1, wherein said adapter is operative to double the stroke length provided by the installation tool.

3. The adapter of claim 1, wherein four pinion gears are retained within said housing.

4. The adapter of claim 1, wherein said adapter is operative to decrease the time required for installing a fastener.

5. The adapter of claim 1, wherein said means for mounting comprises a reducing member having a substantially cylindrical opening therethrough, a proximal end mateable with the distal end of said compression member and a distal end mateable with the installation head sleeve.

6. An assembly for installing blind fasteners, said assembly comprising:

a fastener installation tool having a puller shaft for applying tensile force and a tool body for applying compressive force during operation;

a fastener installation head having a gripping mechanism for applying tensile force to a fastener and a sleeve surrounding said gripping mechanism for applying compressive force; and an adapter joining said tool and said installation head, said adapter comprising:

a tension member having a proximal end mateable with said puller shaft of said installation tool and a distal end mated with said gripping mechanism of said installation head, said tension member also having a first rack gear formed in its outer surface;

a compression member having an opening therethrough with an inner surface and disposed around said tension member, the opening sized to accommodate relative axial sliding of said tension member relative to said compression member, said compression member having a second rack gear formed in said inner surface;

means for mounting said compression member to the installation head sleeve;

a pinion gear housing mated with the tool body; and a plurality of pinion gears retained within said housing and engaged with said first and second rack gears;

wherein said adapter is operative to increase a stroke length provided by the installation tool.

7. The assembly of claim 6, wherein said adapter is operative to double the stroke length provided by the installation tool.

8. The assembly of claim 6, comprising four pinion gears retained within said housing.

9. The assembly of claim 6, wherein said adapter is operative to decrease the time required for installing a fastener.

10. The assembly of claim 6, wherein said means for mounting comprises a reducing member having a substantially cylindrical opening therethrough, a proximal end mated with the distal end of said compression member and a distal end mated with said installation head sleeve.

11. A method for increasing a tool stroke length for installing a blind fastener into a workpiece, said method comprising the steps of:

providing an installation tool assembly, said assembly comprising:

a fastener installation tool having a puller shaft for applying tensile force and a tool body for applying compressive force during operation;

a fastener installation head having a gripping mechanism for applying tensile force to a fastener and a sleeve surrounding said gripping mechanism for applying compressive force, said tool having a stroke length for relative axial motion between said puller shaft and said tool body; and an adapter joining said tool and said installation head, said adapter comprising:

a tension member having a proximal end mated with said puller shaft of said installation tool and a distal end mated with said gripping mechanism of said installation head, said tension member also having a first rack gear formed in its outer surface;

a compression member having an opening therethrough with an inner surface and disposed around said tension member, the opening sized to accommodate relative axial sliding of said tension member relative to said compression member, said compression member having a second rack gear formed in said inner surface;

means for mounting said compression member to the installation head sleeve;

a pinion gear housing mated with the tool body; and a plurality of pinion gears retained within said housing and engaged with said first and second rack gears;

wherein said adapter is operative to increase a stroke length provided by the installation tool;

providing a workpiece having a hole extending therethrough sized to accommodate said blind fastener;

inserting said blind fastener through the hole and gripping a stem of said fastener with said gripping mechanism; and using said tool puller shaft to simultaneously apply tensile force to said tensile member of said adapter and compressive force to said pinion gear housing, thereby causing said first rack gear to drive said pinion gears, which in turn drive said second rack gear.

12. The method of claim 11, wherein said using step comprises installing said fastener using a single tool stroke.

13. The method of claim 11, wherein:

said first and second rack gears have a 1:1 gear ratio; and said using step comprises providing a stroke length to said fastener head that is twice said tool stroke length.

14. The method of claim 11, wherein said using step comprises providing a stroke length to said fastener head that is longer than about $\frac{3}{8}$ inch.

15. The method of claim 11, wherein said using step decreases the time required for installing a fastener.

16. The method of claim 11, wherein said means for mounting comprises a reducing member having a substantially cylindrical opening therethrough, a proximal end mated with the distal end of said compression member and a distal end mated with said installation head sleeve.

* * * * *